US007656376B2

(12) United States Patent
Chiou

(10) Patent No.: US 7,656,376 B2
(45) Date of Patent: Feb. 2, 2010

(54) GAMMA VOLTAGE GENERATION CIRCUIT

(75) Inventor: Yu-Wen Chiou, Hsinhua (TW)

(73) Assignee: Himax Technologies Limited, Tainan County (TW)

( * ) Notice: Subject to any disclaimer, the term of this patent is extended or adjusted under 35 U.S.C. 154(b) by 559 days.

(21) Appl. No.: 11/456,167

(22) Filed: Jul. 7, 2006

(65) Prior Publication Data

US 2008/0007503 A1 Jan. 10, 2008

(51) Int. Cl.
*G09G 3/36* (2006.01)
*G02F 1/1333* (2006.01)

(52) U.S. Cl. ........................................... 345/89; 349/85

(58) Field of Classification Search ........... 345/87-111; 349/85, 144, 173

See application file for complete search history.

(56) References Cited

U.S. PATENT DOCUMENTS

2003/0151617 A1* 8/2003 Morita ....................... 345/690

FOREIGN PATENT DOCUMENTS

CN 1437083 A 8/2003
JP 2005-202057 A 7/2005

* cited by examiner

*Primary Examiner*—Srilakshmi K Kumar
(74) *Attorney, Agent, or Firm*—Patterson & Sheridan, LLP

(57) ABSTRACT

A gamma-voltage generation circuit is arranged to output groups of gamma voltages. The circuit has a resister string and several switches. The resistor string has several resistors connected in series and is grouped into several segments, wherein each of the segments provides one of the gamma voltages. The switches respectively couple to several nodes between the resistors in one of the segments. Wherein the switches are closed when one of the groups of the gamma voltages are output and the switches are opened when another one of the groups of the gamma voltages are output.

5 Claims, 5 Drawing Sheets

GAMMA VOLTAGE GENERATION CIRCUIT

BACKGROUND OF THE INVENTION

1. Field of the Invention

The present invention relates to a gamma voltage generation circuit. More particularly, the present invention relates to a gamma voltage generation circuit used in LTPS (low temperature polycrystalline silicon) panels.

2. Description of the Related Art

FIG. 1 shows a traditional gamma voltage generation circuit. The gamma voltage generation circuit provides groups of gamma voltages for different colors to DACs (digital-to-analog converters). The gamma voltage generation circuit has resistor strings 105, 115, 125 and 135 respectively for red, green, blue and white, and buffers 191~198. Each resistor string receives reference voltages through the buffers and outputs to a corresponding DAC the gamma voltages derived by division of the reference voltages. For example, the resistor string 105 for red receives reference voltages through the buffers 191 and 195, and outputs the gamma voltages to the DACs 103 and 107 for red.

FIG. 2 shows another traditional gamma voltage generation circuit. The main difference between the circuits of FIG. 1 and FIG. 2 is that the latter is adapted to DACs shared by red, green, blue and white channels. Thus, switches are included to selectively transfer to the DACs the group of the gamma voltages provided by one of the resistor strings. For example, the switches 205 and 206 are closed to transfer to the DACs 240 and 250 the group of the gamma voltages provided by the resistor string 105 when red channels are selected.

Both of the gamma voltage generation circuits described above include one resistor string for each color. These resistor strings consume a large circuit area. Moreover, using one resistor string for each color necessitates a large number of I/O pads, which also consumes a large circuit area.

SUMMARY OF THE INVENTION

It is therefore an aspect of the present invention to provide a gamma-voltage generation circuit to reduce the layout size and the number of the pads of the input pins between the PCBA and the source driver.

According to one preferred embodiment of the present invention, the gamma-voltage generation circuit is arranged to output groups of gamma voltages. The circuit has a resister string and several switches. The resistor string has several resistors connected in series and is grouped into several segments, wherein each of the segments provides one of the gamma voltages. The switches respectively couple to several nodes between the resistors in one of the segments. Wherein the switches are closed when one of the groups of the gamma voltages are output and the switches are opened when another one of the groups of the gamma voltages are output.

According to another preferred embodiment of the present invention, the gamma-voltage generation circuit is arranged to provide a first and second groups of gamma voltages. The gamma-voltage generation circuit has a resistor string and at least a switch. The resistor string has resistors connected in series and provides the first or second group of the gamma voltages on nodes between the resistors. The switch couples across two of the nodes between the resistors. Wherein the switch is closed and opened respectively when the resistor string outputs the first and second groups of the gamma voltages.

It is to be understood that both the foregoing general description and the following detailed description are examples and are intended to provide further explanation of the invention as claimed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, aspects, and advantages of the present invention will become better understood with regard to the following description, appended claims, and accompanying drawings where:

DETAILED DESCRIPTION

Figure 1:
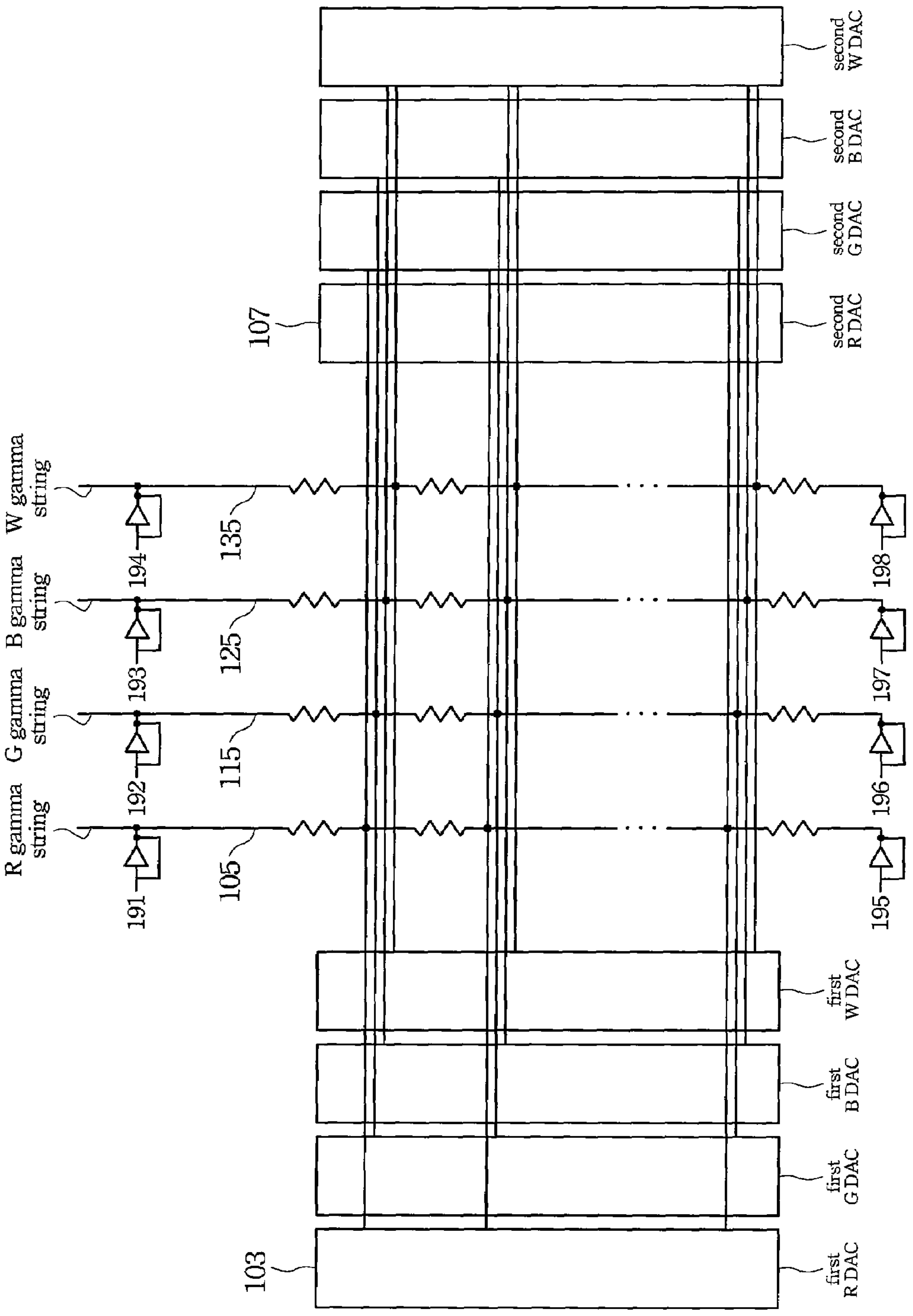
Fig. 1 (prior art)
FIG. 1 shows a traditional gamma voltage generation circuit.

Reference will now be made in detail to the present preferred embodiments of the invention, examples of which are illustrated in the accompanying drawings. Wherever possible, the same reference numbers are used in the drawings and the description to refer to the same or like parts.

Figure 3:
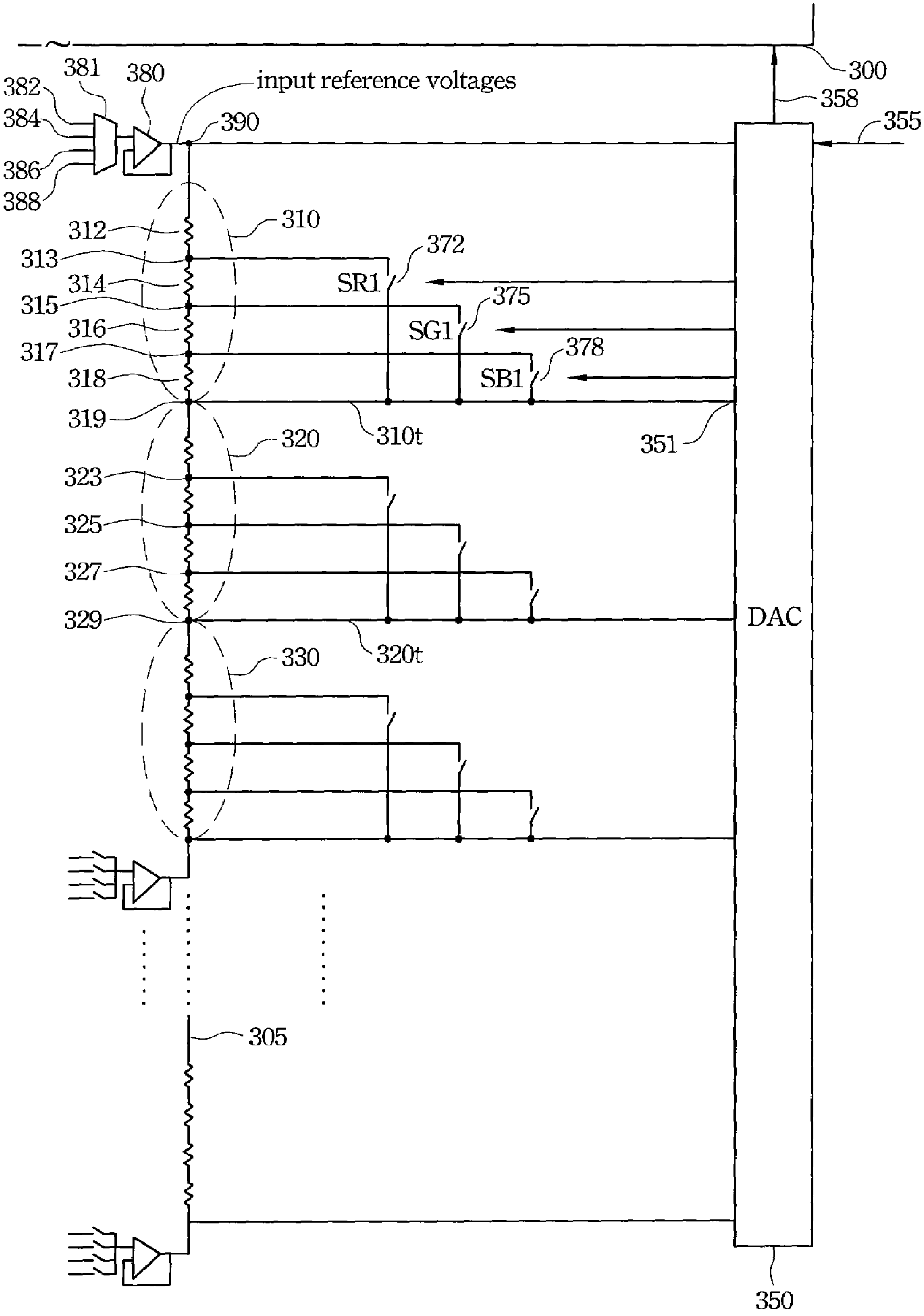
FIG. 3 shows a gamma voltage generation circuit according to a first preferred embodiment of the present invention.

FIG. 3 shows a gamma voltage generation circuit according to a first preferred embodiment of the present invention. This gamma-voltage generation circuit reduces the layout area and the number of the pads of the input pins between the PCBA and the source driver. The gamma-voltage generation circuit is arranged to output groups of gamma voltages of a plurality of colors to a display panel 300. The circuit has a resistor string 305, and several switches 372, 375 and 378. The resistor string 305 has several resistors 312, 314, 316 and 318 connected in series and grouped into several segments 310, 320 and 330, wherein each of the segments provides one of the gamma voltages. The switches 372, 375 and 378 respectively couple to several nodes 313, 315 and 317 between the resistors in one of the segments.

Wherein the switches 372, 375 and 378 are closed when one of the groups of the gamma voltages are output and the switches are opened when another one of the groups of the gamma voltages are output. Therefore, the specific switches control the gamma voltages of same group.

The gamma voltage generation circuit further has a digital-to-analog converter 350 to control the switches 372, 375 and 378 by the digital signals (transmitted by 355). The digital-to-analog converter 350 also receives the first and second groups of the gamma voltages by the transmission lines 310*t* and 320*t*, and outputs the gamma-voltages to the panel 300 (transmitted by 358).

In The gamma voltage generation circuit, the groups of the gamma voltages can be increased as a first, second, third and fourth groups of the gamma voltages. Therefore, the segment 310 has a first resistor 312, a second resistor 314, a third resistor 316 and a fourth resistor 318 connected in series. The switches includes several first switches 372, second switches 375 and several switches 378. Each of first switches 372 has one end coupled to the node 313 where the first resistor 312 and the second resistor 314 are connected, and the other end coupled to a node outputting one of the gamma voltages. Each of the second switches 375 has one end coupled to the node 315 where the second resistor 314 and the third resistor 316 are connected, and the other end coupled to the node outputting one of the gamma voltages. Each of third switches 378 has one end coupled to the node 317 where the third resistor 316 and fourth resistor 318 are connected, and the other end coupled to the node outputting one of the gamma voltages. Furthermore, the nodes outputting the gamma voltages to the digital-to-analog converter 350 described above are on the transmission lines 310*t*.

In this circuit, the first, second, third and fourth groups of the gamma voltages are gamma voltages for red, green, blue and white. For example, in the segment 310, the nodes 313, 315, 317 and 319 are respectively arranged to provide the gamma-voltages of red, green, blue and white.

Moreover, since the gamma curves of different colors are different, the magnitude relationships of gamma voltages of different colors are different. Therefore, the orders of the different gamma voltages provided by the nodes in different segments are either the same or different. For example, in the segment 310, the order of the different gamma voltages provided by the nodes 313, 315, 317 and 319 is red-green-blue-white; in the segment 320, the order of the different gamma voltages provided by the nodes 323, 325, 327 and 329 might be red-blue-green-white.

The gamma voltage generation circuit further has a selector 381 and a buffer device 380. The selector 381 selects one of several reference voltages 382, 384, 386 and 388. The buffer device 380 receives and outputs the selected reference voltage to the resistor string 305 at an input end 390 of the input pins. Therefore, the different colors use a common input end 390, and this kind of design can reduce the number of the pads of the input pins between the PCBA and the source driver.

Figure 2:
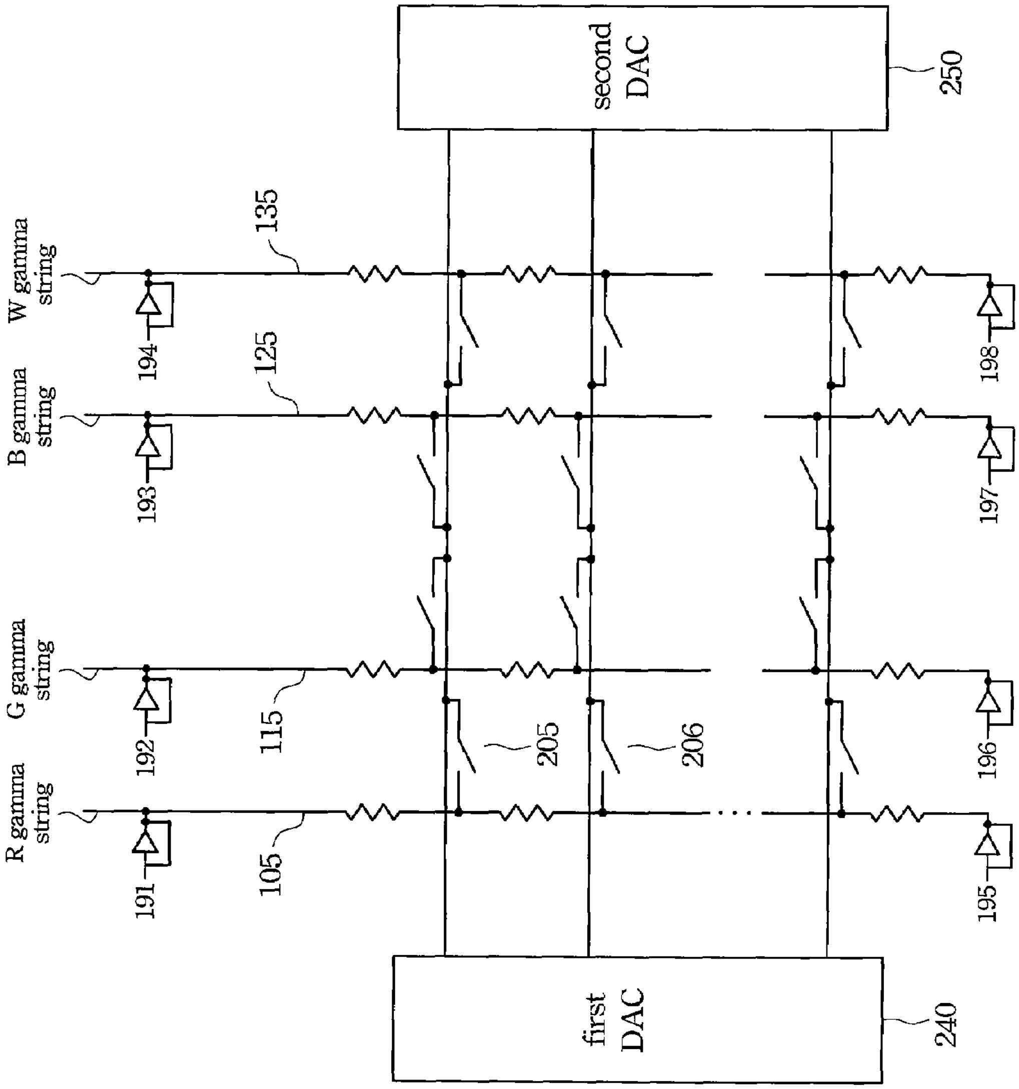
Fig. 2 (prior art)
FIG. 2 shows another traditional gamma voltage generation circuit.

Compared with the traditional gamma-voltage generation circuits of the prior art in FIG. 1 and FIG. 2, if the gamma-voltage generation circuit of the first preferred embodiment needs 7 pads of the input pins between the PCBA and the source driver, the traditional gamma-voltage generation circuit will need up to 28 input pads.

In order to make the different gamma curves of different colors stable, the first reference voltage 382, second reference voltage 384, third reference voltage 386 and fourth reference voltage 388 are selected when the gamma voltages for red, green, blue and white are output respectively.

Figure 4:
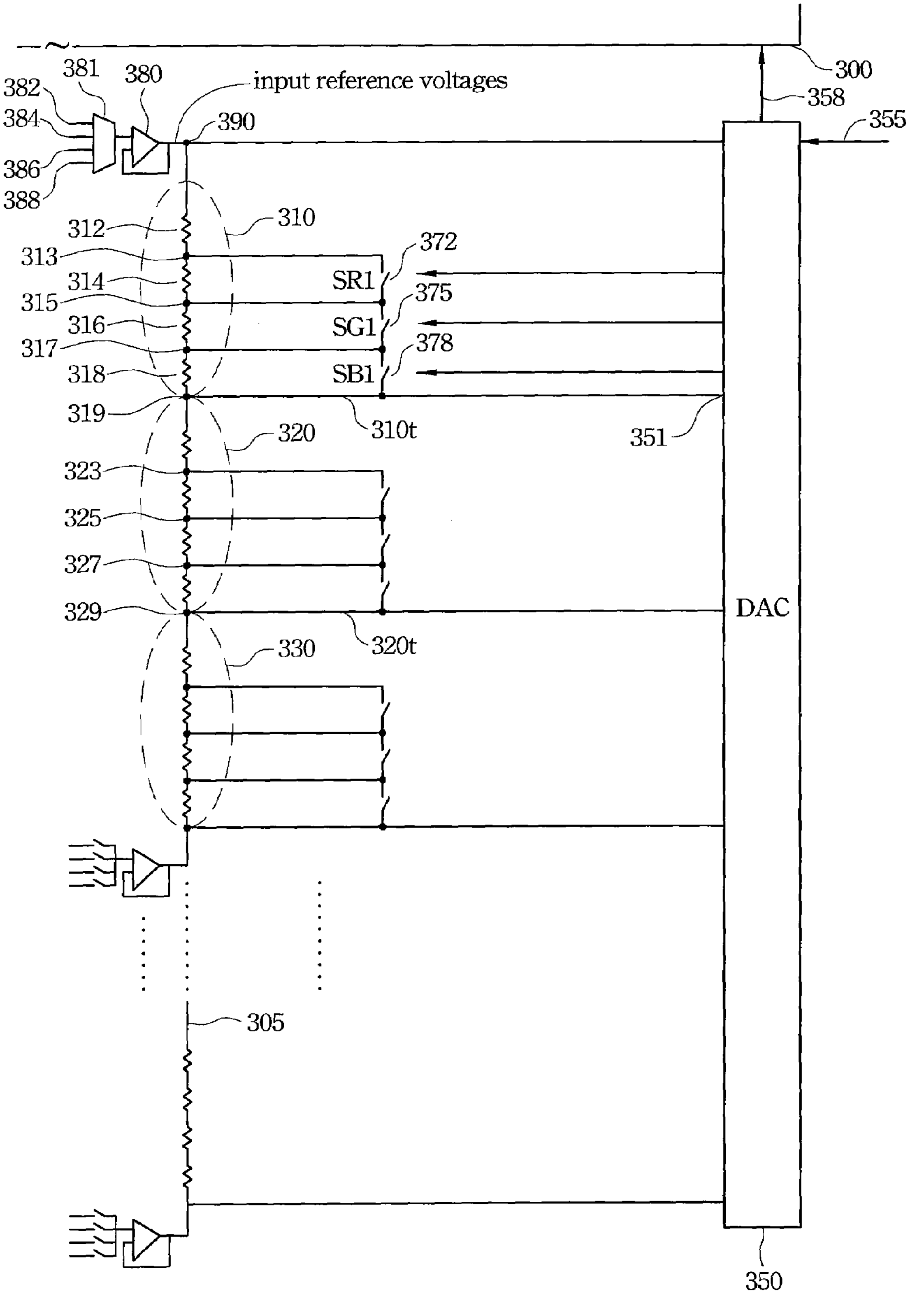
FIG. 4 shows a gamma voltage generation circuit according to a second preferred embodiment of the present invention.

FIG. 4 shows a gamma voltage generation circuit according to a second preferred embodiment of the present invention. The difference between the circuits of FIG. 3 and FIG. 4 is that the switches of the circuit of FIG. 4 are coupled across two of the nodes between the resistors. For example, the switches 372, 375 and 378 are coupled across the nodes between the resistors 314, 316 and 318 respectively. In another word, the switch 372 couples between the nodes 313 and 315, the switch 375 couples between the nodes 315 and 317, and the switch 378 couples between the nodes 317 and 319. In other preferred embodiments, the configuration of switch can be transformed. For example, the switch 372 can be configured to couple between the nodes 313 and 317 directly.

Figure 5:
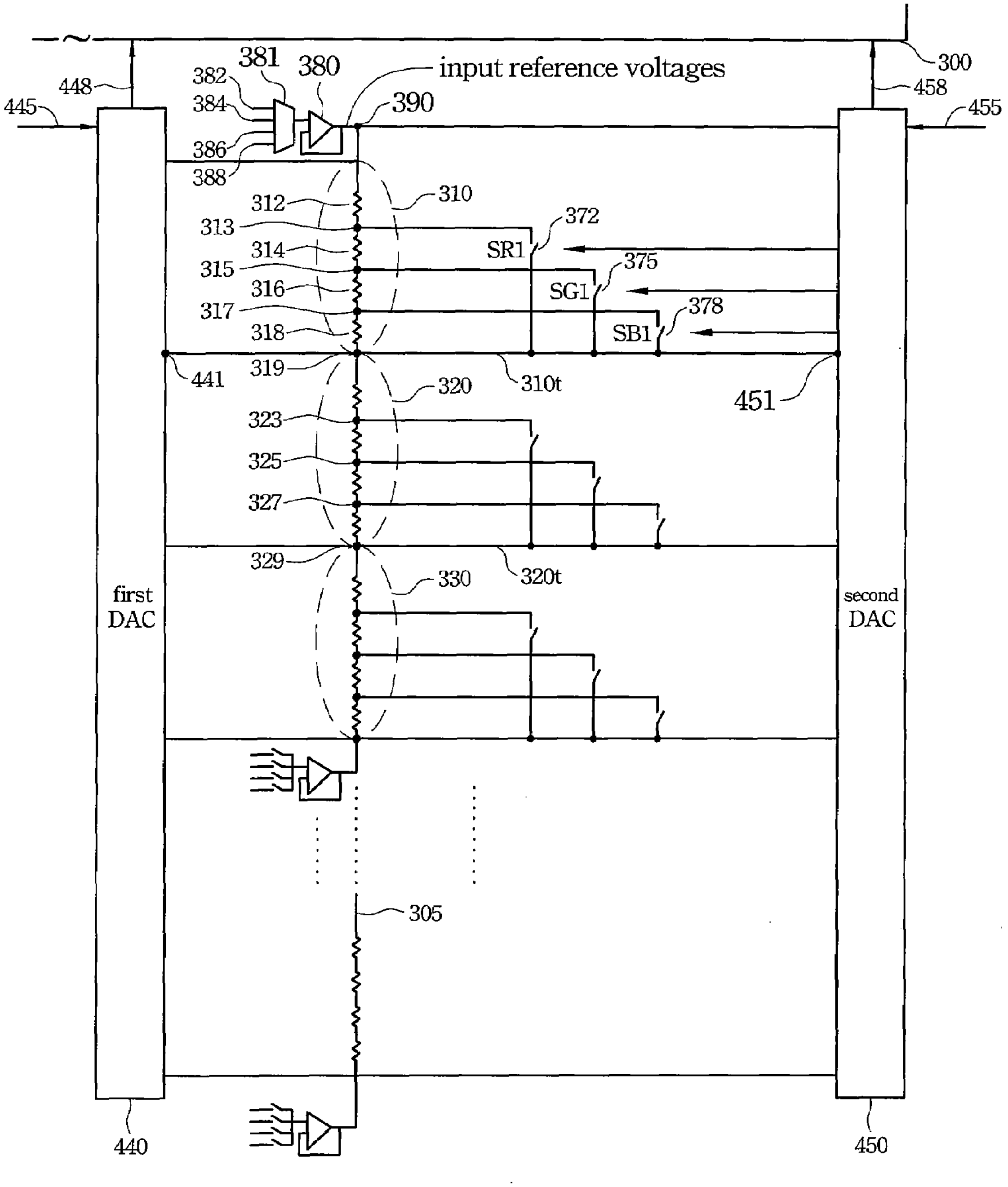
FIG. 5 shows a gamma voltage generation circuit according to a third preferred embodiment of the present invention.

FIG. 5 shows a gamma voltage generation circuit according to a third preferred embodiment of the present invention. The difference between the circuits of FIG. 3 and FIG. 5 is that the circuit of FIG. 5 has two digital-to-analog converters, a first digital-to-analog converter 440 and a second digital-to-analog converter 450. The first digital-to-analog converter 440 couples to a first end (such as 441) of each transmission line (such as 310*t*) and is arranged to receive a plurality of first digital signals (transmitted by 445) to select and output the gamma-voltages (transmitted by 448). The second digital-to-analog converter 450 couples to a second end (such as 451) of each transmission line (such as 310*t*) and is arranged to receive a plurality of second digital signals (transmitted by 455) to select and output the gamma-voltages (transmitted by 458).

The gamma-voltage generation circuits of the present invention use fewer resistor strings. It is therefore the gamma-voltage generation circuits of the present invention can reduce the layout area and the number of pads of the input pins between the PCBA and the source driver.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A gamma voltage generation circuit providing groups of gamma voltages, the gamma voltage generation circuit comprising:

a resistor string having a plurality of resistors connected in series and grouped into a plurality of segments, wherein each of the segments provides one of the gamma voltages;

a plurality of switches respectively coupled to a plurality of nodes between the resistors in one of the segments; and wherein the switches are closed when one of the groups of the gamma voltages are output and the switches are opened when another one of the groups of the gamma voltages are output, and wherein first, second, third and fourth groups of the gamma voltages are output, each of the segments has first, second, third and fourth resistors connected in series, and the switches comprise:

a plurality of first switches, each of which has one end coupled to the node where the first and second resistors are connected, and the other end coupled to the node outputting one of the gamma voltages;

a plurality of second switches, each of which has one end coupled to the node where the second and third resistors are connected, and the other end coupled to the node outputting one of the gamma voltages; and a plurality of third switches, each of which has one end coupled to the node where the third and fourth resistors are connected, and the other end coupled to the node outputting one of the gamma voltages.

2. The gamma voltage generation circuit as claimed in claim 1 further comprising a digital-to-analog converter controlling the switches and receiving a first and second groups of the gamma voltages.

3. The gamma voltage generation circuit as claimed in claim 1, wherein the first, second, third and fourth groups of the gamma voltages are gamma voltages for red, green, blue and white.

4. The gamma voltage generation circuit as claimed in claim 3 further comprising:

a selector selecting one of a plurality of reference voltages; and a buffer device receiving and outputting the selected reference voltage to the resistor string.

5. The gamma voltage generation circuit as claimed in claim 4 wherein a first, second, third and fourth reference voltages are selected when the gamma voltages for red, green, blue and white are output respectively.

* * * * *